US012300252B2

(12) United States Patent
Dentel et al.

(10) Patent No.: US 12,300,252 B2
(45) Date of Patent: May 13, 2025

(54) CONTROLLING ACCESS TO HISTORICAL CALL DATA

(71) Applicant: MOTOROLA SOLUTIONS, INC., Chicago, IL (US)

(72) Inventors: Natalie D. Dentel, Chesterfield, VA (US); Matthew Seeley, Sandy, UT (US); Chun Wang, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 149 days.

(21) Appl. No.: 18/056,084

(22) Filed: Nov. 16, 2022

(65) Prior Publication Data

US 2024/0161753 A1    May 16, 2024

(51) Int. Cl.
| | |
|---|---|
| *G10L 15/08* | (2006.01) |
| *G10L 17/04* | (2013.01) |
| *G10L 17/06* | (2013.01) |
| *G10L 17/22* | (2013.01) |
| *H04M 3/51* | (2006.01) |

(52) U.S. Cl.
CPC .............. *G10L 17/22* (2013.01); *G10L 17/04* (2013.01); *G10L 17/06* (2013.01); *H04M 3/5183* (2013.01)

(58) Field of Classification Search
CPC ......... G10L 17/00; G10L 15/08; G10L 15/22; G10L 17/04; G06F 21/32; G06F 3/167; G06F 21/31; G06F 21/6245; G06F 16/636; G06F 12/31; H04L 63/0861; H04L 9/3231; H04L 63/08; H04W 12/06
See application file for complete search history.

(56) References Cited

U.S. PATENT DOCUMENTS 8,917,853 B2   12/2014  Dheap et al.
11,812,194 B1 * 11/2023  Vandyke ................. G06F 3/167
(Continued)

FOREIGN PATENT DOCUMENTS

EP     2790394 B1   11/2017
WO  2016172339 A1   10/2016

OTHER PUBLICATIONS

International Search Report and Written Opinion for Application No. PCT/US2023/078177 dated Mar. 12, 2024 (13 pages).

(Continued)

*Primary Examiner* — Jakieda R Jackson
(74) *Attorney, Agent, or Firm* — Michael Best & Friedrich LLP

(57) ABSTRACT

An electronic processor that may be configured to perform a first voiceprint analysis of first audio data of a first call from a first caller to determine a first voiceprint of the first caller, and determine that the first voiceprint matches a first previously-stored voiceprint. The first previously-stored voiceprint may identify and be associated with first previously-stored information regarding a previous call from the first caller that is anonymized so as not to include a name of the first caller or a phone number of the first caller. The electronic processor may also receive a permission command based on a user input from the first caller to indicate that a call taker handling the first call is allowed to have access to the first previously-stored information. The electronic processor may output the first previously-stored information on a call taker device in response to receiving the permission command.

20 Claims, 11 Drawing Sheets

(56) References Cited

U.S. PATENT DOCUMENTS

| | | | |
|---|---|---|---|
| 11,893,999 B1* | 2/2024 | Kopuri | G10L 17/00 |
| 2003/0216923 A1* | 11/2003 | Gilmore | G10L 13/027 |
| | | | 704/270.1 |
| 2004/0010408 A1* | 1/2004 | Mani | G10L 17/00 |
| | | | 704/E17.003 |
| 2007/0206765 A1* | 9/2007 | Shaffer | H04M 3/5183 |
| | | | 379/265.01 |
| 2008/0022133 A1* | 1/2008 | Sobel | G06F 21/6254 |
| | | | 713/193 |
| 2010/0158207 A1* | 6/2010 | Dhawan | H04M 1/2478 |
| | | | 379/88.02 |
| 2010/0158236 A1* | 6/2010 | Chang | H04M 3/5175 |
| | | | 379/265.03 |
| 2012/0233014 A1* | 9/2012 | Banks | G06Q 40/02 |
| | | | 705/26.7 |
| 2015/0025888 A1 | 1/2015 | Sharp | |
| 2016/0267921 A1* | 9/2016 | Dang | G06F 16/433 |
| 2016/0309030 A1 | 10/2016 | Tietsch | |
| 2017/0034177 A1* | 2/2017 | Narasimhan | G06Q 50/265 |
| 2017/0185790 A1* | 6/2017 | Gauda | G06F 21/1079 |
| 2017/0188207 A1* | 6/2017 | Chien | H04W 4/80 |
| 2017/0279906 A1* | 9/2017 | Laird-Mcconnell | H04L 67/14 |
| 2018/0060601 A1* | 3/2018 | Kay | H04W 12/08 |
| 2018/0189504 A1* | 7/2018 | Ghafourifar | G06F 21/602 |
| 2018/0190296 A1* | 7/2018 | Williams | G10L 17/04 |
| 2019/0130123 A1* | 5/2019 | Ben-Yair | G06F 21/606 |
| 2020/0312337 A1 | 10/2020 | Stafylakis et al. | |
| 2020/0366671 A1* | 11/2020 | Larson | G06F 9/451 |
| 2021/0073766 A1* | 3/2021 | Gonzales | G06Q 20/3276 |
| 2022/0191683 A1* | 6/2022 | Shah | G10L 15/22 |
| 2022/0305202 A1* | 9/2022 | Rosinko | G06Q 30/0633 |
| 2022/0377171 A1* | 11/2022 | Joshi | H04M 3/42085 |
| 2023/0108263 A1* | 4/2023 | Eneim | G06F 21/6254 |
| | | | 726/29 |
| 2023/0113338 A1* | 4/2023 | Buddhiraju | G06F 21/604 |
| | | | 726/27 |
| 2023/0319332 A1* | 10/2023 | Sullivan | G06N 5/01 |
| 2023/0359765 A1* | 11/2023 | Selvaraju | G06F 21/6245 |
| 2023/0413019 A1* | 12/2023 | Lindsay | H04W 4/12 |
| 2024/0143821 A1* | 5/2024 | Racz | G06F 21/6227 |

OTHER PUBLICATIONS

Amazon, "Use real-time caller authentication with Voice ID," Amazon.com <https://docs.aws.amazon.com/connect/latest/adminguide/voice-id.html> initial release of the Amazon Connect Administrator Guide on Mar. 28, 2017 (4 pages).

Motorola Solutions, "Vesta Solutions Suite," Motorolasolutions.com <https://www.motorolasolutions.com/en_us/products/command-center-software/ng9-1-1-call-management/vesta.html?gclid=CjwKCAjwwL6aBhBIEiwADycBINouzc6q22Z1h2c1dSb34VZb_0AtxyXRmfMTXnZMfOt08fSW_XXBHBoCTpwQAvD_BwE#tabproductinfo> available at least as early as Oct. 19, 2022 (6 pages).

* cited by examiner

605

```
Call Information Display
[Current] [Manual] [Recent]
5555555555

ANI: 555-555-5555
Date: 2/26/2018 5:16:10 PM
Name: Verizon Cellular
Address: Sector - West
City: Orlando
COUNTRY: Orange County
State: FL
ESN: 110
COS: WPH2
Lat: 26.551197
Long: -81.876658
Conf:
Radius: 90
ALIsrvr: A01
```

| Manual Request | Update | Clear | Incorrect Location | Enhanced Data |

| Call Information Display | Recent Calls | Abandoned Calls |

Call Control

| Ready | Answer | Release | Local Hold | Transfer |

Notes From Previous Calls:
- Admitted To Drug Case
- Agitated When Questioned About Family History
- Responded Positively To Conversation Regarding Sports

615

| Queues | 911 | Admin | Personal |

FIG. 6A

| Text Conversations | | |
|---|---|---|
| | 5555555555<br>Connected | Release |

5555555555
Connected

3186751234
Released

Caller: I Would Like Some Help.

Automated Message: You Have Reached The 9-8-8 Crisis Hotline. How Can We Assist You?

Send
Clear

Initial　　General　　Law　　Suspect　　Fine　　...

Text Calls

| Date | Time | CPN | Initial Text Message | State △ |
|---|---|---|---|---|
| 2/26/2018 | 4:07:23 PM | 5555555555 | I need to talk to someone. | Connected |
| 2/26/2018 | 4:07:23 PM | 3186751234 | Is a psychologist available? | Queued |
| 2/26/2018 | 4:07:23 PM | 9515535115 | I have a mental health concern. | Abandoned |

🖐 Pickup

Log Of Previous Calls:
- 7:32 PM On Tuesday, May 18 (16 Minutes)
- 8:27 PM On Wednesday, May 26 (9 Minutes)
- 7:43 PM On Tuesday, April 2 (14 Minutes)

*620*

Identifying Information:

Phone Number
(555) 555-5555

Last Location Update
4:19:13

Probable Address
1340 Cypress Terrace
Cir, Fort Myers, FL
33907, USA

Likelihood: 100%

Latitude/Longitude
Lat/Long: 26.5411197, -81.875658
Radius: 40m Confidence:
Altitude: 197m Name: John Smith

*610*

Medical Information *630*

| Blood Type | Disabilities | Allergies |
|---|---|---|

FIG. 6A (Continued)

CONTROLLING ACCESS TO HISTORICAL CALL DATA

BACKGROUND

One or more emergency/crisis prevention call centers may receive calls from callers that are placed to a substance abuse, mental health, and suicide and crisis prevention hotline. The call centers may staff emergency call takers that may receive numerous calls from numerous callers on a daily, weekly, or monthly basis. Many of these calls may be received from callers who have previously called the hotline regarding a similar/related problem about which they previously called and/or regarding a new/different problem than a problem about which they previously called.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features that include the claimed subject matter, and explain various principles and advantages of those embodiments, examples, aspects, and features.

Figure 1:
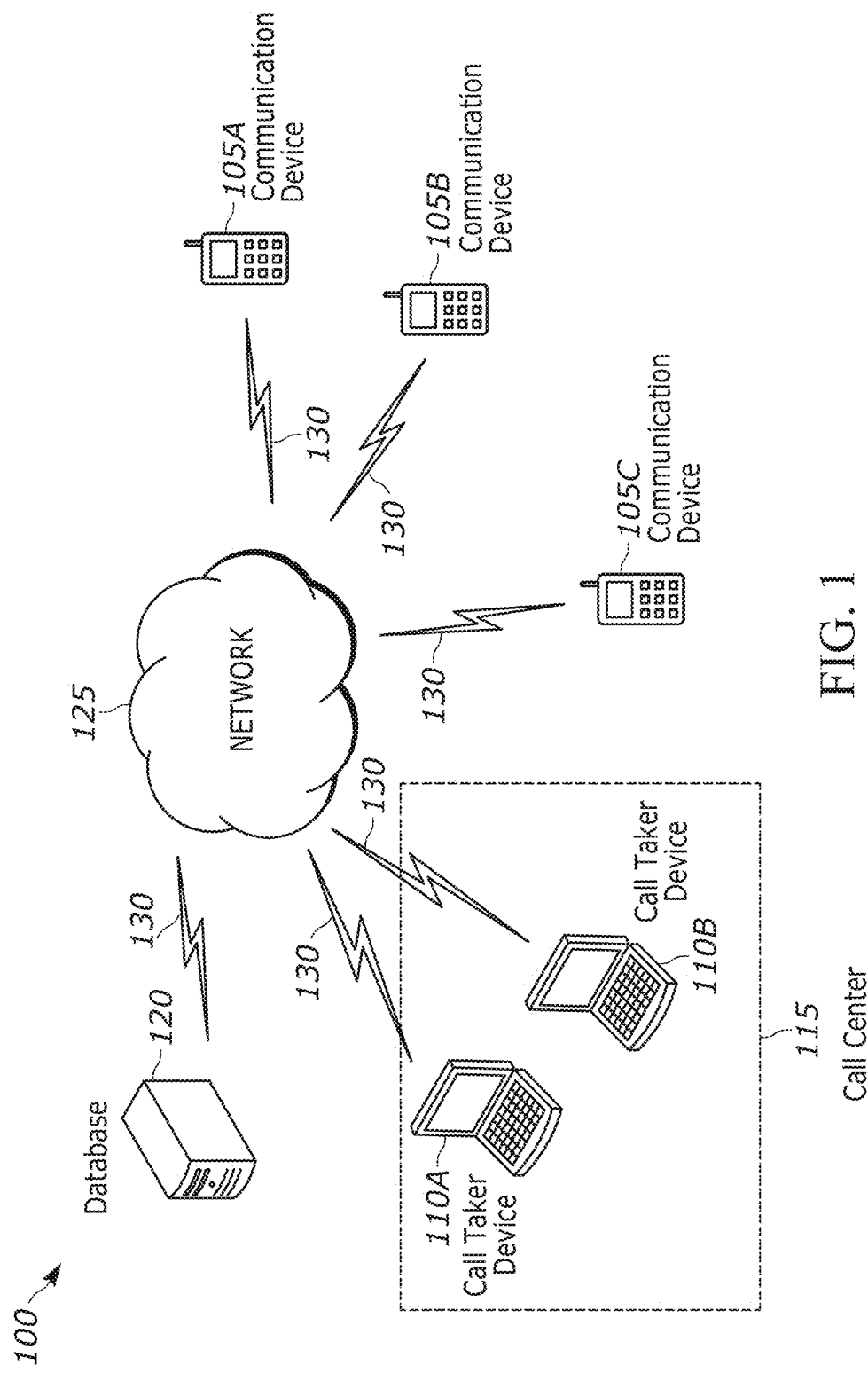
FIG. 1 is a block diagram of a communication system according to one example.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, features, and aspects presented.

The apparatus and method components have been represented where appropriate by conventional symbols in the drawings, showing only those specific details that are pertinent to understanding the embodiments, examples, aspects, and features presented so as not to obscure the disclosure with details that will be readily apparent to those of ordinary skill in the art having the benefit of the description herein.

DETAILED DESCRIPTION

As noted, call centers and call takers receiving calls from a substance abuse, mental health, and suicide and crisis prevention hotline (and/or from any other public safety operated number such as an emergency response number) may receive numerous calls from numerous callers (e.g., human callers). Often, many of these calls are received from callers who have previously called the hotline. Sometimes the repeat callers are calling regarding a similar/related problem about which they previously called. Sometimes the repeat callers are calling regarding a new/different problem. When handling a current call from the caller, it is often useful for call takers to use/reference information from previous calls from the same caller and/or from previous calls that were handled by the same call taker. However, due to the sensitive nature of a problem about which callers may be calling, some callers may be less likely to call to seek help if information regarding their problem or condition is stored and associated with their identifying information (e.g., name, phone number, location, the like, and combinations thereof) rather than their call being anonymous.

Accordingly, there is a tension between (i) allowing callers to remain anonymous and refraining from capturing and/or electronically storing personally identifiable information during a call in order to encourage them to call for help and (ii) electronically storing call history data and selectively utilizing the electronically stored call history data, for example, to route future calls to a proper specialist over an electronic network, to electronically present and provide helpful background information to a call taker handling a future call, and/or the like. Thus, there is a technological problem with respect to storing call history data and providing call history data to a call taker in a manner that keeps the identity of a caller anonymous.

Disclosed are, among other things, methods, devices, and systems for one or more electronic processors to control call taker access to historical call data in a manner according to permission granted by a caller. In other words, historical call data of each caller is accessed and displayed in a manner that may be controlled by the caller. For example, the caller may request to remain anonymous, may provide permission to allow their identity or other identifying information to be displayed, or may choose which identifying information may be displayed to the call taker. As another example, the caller may allow some or all call history data from previous calls placed by the caller to be accessed without restriction, to be accessed in a manner that keeps the caller anonymous (e.g., does not include at least identifying information), or not to be accessed at all.

The disclosed methods, devices, and systems address, among other things, the above-noted technological problem by, in many instances, allowing the call taker to use/reference electronically stored historical call data about the caller while maintaining the anonymity of the caller (i.e., without revealing at least some identifying information about the caller). Such methods, devices, and systems encourage people to call for help by allowing callers to remain anonymous, if desired. Such methods, devices, and systems also allow the caller to control a level of privacy/anonymity with respect to their call history data. Additionally, such methods, devices, and systems also allow callers to receive more informed help from call takers since call takers may reference call history data about the caller if granted permission by the caller to do so anonymously or otherwise.

The disclosed methods, devices, and systems improve, among other things, a user interface of a call taker device by displaying only call history data in which the caller has granted permission to be seen. The user interface may display other information besides the call history data and may anonymize the call history data such that some call history data is shown while at least some identifying information of the caller is not shown. Thus, the improved user interface addresses the above-noted technological problem with respect to providing call history data to a call taker in a manner that keeps at least some identifying information of a caller anonymous.

One example provides an electronic computing device that includes an electronic processor that may be configured to analyze, using audio analytics, a first call received at a call center from a communication device operated by a first caller to determine first audio data corresponding to a first voice of the first caller. The electronic processor may also be configured to perform a first voiceprint analysis of the first audio data to determine a first voiceprint of the first caller. The electronic processor may also be configured to determine that the first voiceprint matches a first previously-stored voiceprint. The first previously-stored voiceprint may identify and be associated with first previously-stored information regarding a previous call from the first caller. The first previously-stored information may be anonymized so as not to include a name of the first caller or a phone number of the first caller. The electronic processor may also be configured to receive a permission command based on a user input from the first caller. The permission command may indicate that a call taker handling the first call is allowed to have access to the first previously-stored information. The electronic processor may also be configured to output the first previously-stored information on a call taker device in response to receiving the permission command.

Another example provides a method of controlling access to historical call data. The method may include analyzing, with an electronic processor and using audio analytics, a first call received at a call center from a communication device operated by a first caller to determine first audio data corresponding to a first voice of the first caller. The method may further include performing, with the electronic processor, a first voiceprint analysis of the first audio data to determine a first voiceprint of the first caller. The method may further include determining, with the electronic processor, that the first voiceprint matches a first previously-stored voiceprint. The first previously-stored voiceprint may identify and be associated with first previously-stored information regarding a previous call from the first caller. The first previously-stored information may be anonymized so as not to include a name of the first caller or a phone number of the first caller. The method may further include receiving, with the electronic processor, a permission command based on a user input from the first caller. The permission command may indicates that a call taker handling the first call is allowed to have access to the first previously-stored information. The method may further include outputting, with the electronic processor, the first previously-stored information on a call taker device in response to receiving the permission command.

FIG. 1 is a block diagram of a communication system 100 according to one example. The communication system 100 includes communication devices 105A through 105C. In the following description, when explaining how a single communication device functions, a reference to communication device 105 is used. The communication device 105 may be any one of a number of different types of communication devices. For example, communication device 105 may include a smart phone, a battery powered portable radio, and/or a laptop computer that can receive input from a user via a keyboard, a touchscreen display, a microphone (for example, voice commands), and the like. The communication device 105 may include a tablet, a desktop computer, a vehicular mobile communication device, or a similar device. Each communication device 105 may be associated with a user/caller (e.g., a personal smart phone). However, some communication devices 105 may be shared/used by multiple different users/callers (e.g., a land line phone in a private residence, a phone at an office building, a pay phone, etc.). The types of communication devices 105 described above and shown in FIG. 1 are merely examples. In other examples, the communication system 100 includes other types of communication devices 105. In some examples, the communication system 100 includes more or fewer communication devices 105 than the quantity of communication devices 105 shown in FIG. 1.

As shown in FIG. 1, the communication system 100 also includes a call center 115. For example, the call center 115 is an emergency/crisis prevention call center that receives calls that are placed to a substance abuse, mental health, and suicide and crisis prevention hotline (e.g., by dialing 9-8-8 in the United States, etc.). In some instances, the call center 115 is a different type of call center that receives different types of calls (e.g., emergency calls placed by dialing 9-1-1 in the United States, etc.). In some instances, the call center 115 receives calls relating to public safety/public safety incidents (e.g., including incidents where citizens call with respect to an emergency, substance abuse, mental health, suicide, and/or the like as indicated above). In some instances, the call center 115 receives multiple different types of calls and may be staffed with call takers trained to handle the multiple different types of calls. In some examples, the call center 115 includes more or fewer call taker devices 110 than the quantity of call taker devices 110 shown in FIG. 1. Although FIG. 1 shows a single call center 115, in some instances, the communication system 100 includes additional call centers 115 that each include one or more call taker devices 115.

In some examples, the call center 115 includes one or more call taker devices 110A and 110B that are part of the communication system 100. In the following description, when explaining how a single call taker device functions, a reference to call taker device 110 is used. In some examples, the call taker devices 110 are call taking consoles/workstations that are each operated by a separate call taker (e.g., a licensed psychologist or other specialist, a trained crisis prevention employee, a trained volunteer, a public safety officer, and/or the like). Although the call taker devices 110 are described as being located at the call center 115, in some instances, the call taker devices 110 are portable devices and/or are operated and receive calls at locations outside of the call center 115. The call taker devices 110 may receive calls (e.g., voice calls, video calls, text messages, and/or the like) from citizens who enter a certain number (e.g., 9-8-8) on their communication device 105 in order to communicate with a call taker at the call center 115. In some examples, a call taker device 110 operated by a call taker determines an action to take during an ongoing call in an automated manner (for example, using a phone tree and/or voice analytics).

As indicated in FIG. 1, the communication devices 105 and the call taker devices 110 may communicate with each other over a network 125 over respective wireless links 130 and via corresponding network interfaces including one or more transceiver circuits (for example, by sending and receiving radio signals). The network 125 may include wireless and wired portions. All or parts of the network 115 may be implemented using various existing networks that communicate using radio frequency (RF) signals, for example, a cellular network, a Long Term Evolution (LTE) network, a 3GPP compliant network, a 5G network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The communication system 100 may also include future developed networks. In some examples, the communication system 100 may also implement a combination of the networks mentioned previously herein.

In some instances, the communication devices 105 and the call center 115 (i.e., a call taker device 110 at the call center 115) may communicate directly with each other via direct-mode wireless link(s) using a communication channel or connection that is outside of the network 125. For example, the communication devices 105 and the call center 115 communicate directly with each other when they are within a predetermined distance from each other. In some instances, any one of the communication devices 105 may communicate with one or more other communication devices 105 via the network 125 and/or via a direct-mode wireless link.

The system 100 may also include one or more databases 120. The database(s) 120 may be implemented on a server or other device located remotely from the call center 115 that is accessible via wired and/or wireless communication by the call taker devices 110 at the call center 115. In some instances, one or more databases 120 may be implemented on a server located at one or more call centers 115 and/or included on one or more call taker devices 110. In other words, the database 120 may be implemented on any one or a combination of devices at the same location or different locations. In some instances, the database 120 stores information regarding calls received and handled by one or more call taker devices 110 at one or more call centers 115. As explained in greater detail below, the electronically captured and stored information regarding calls received and handled by the call taker devices 110 may include voiceprint information of callers, telephone numbers of callers, names of callers, addresses/locations of callers, dates and/or times associated with calls, types/categories of previous calls, notes/information received regarding calls, outcomes of previous calls, and/or the like. Although FIG. 1 shows a single database 120, in some instances, the system 100 may include multiple databases 120, and/or a single database 120 may be implemented on/accessible via multiple devices (e.g., servers).

Figure 2:
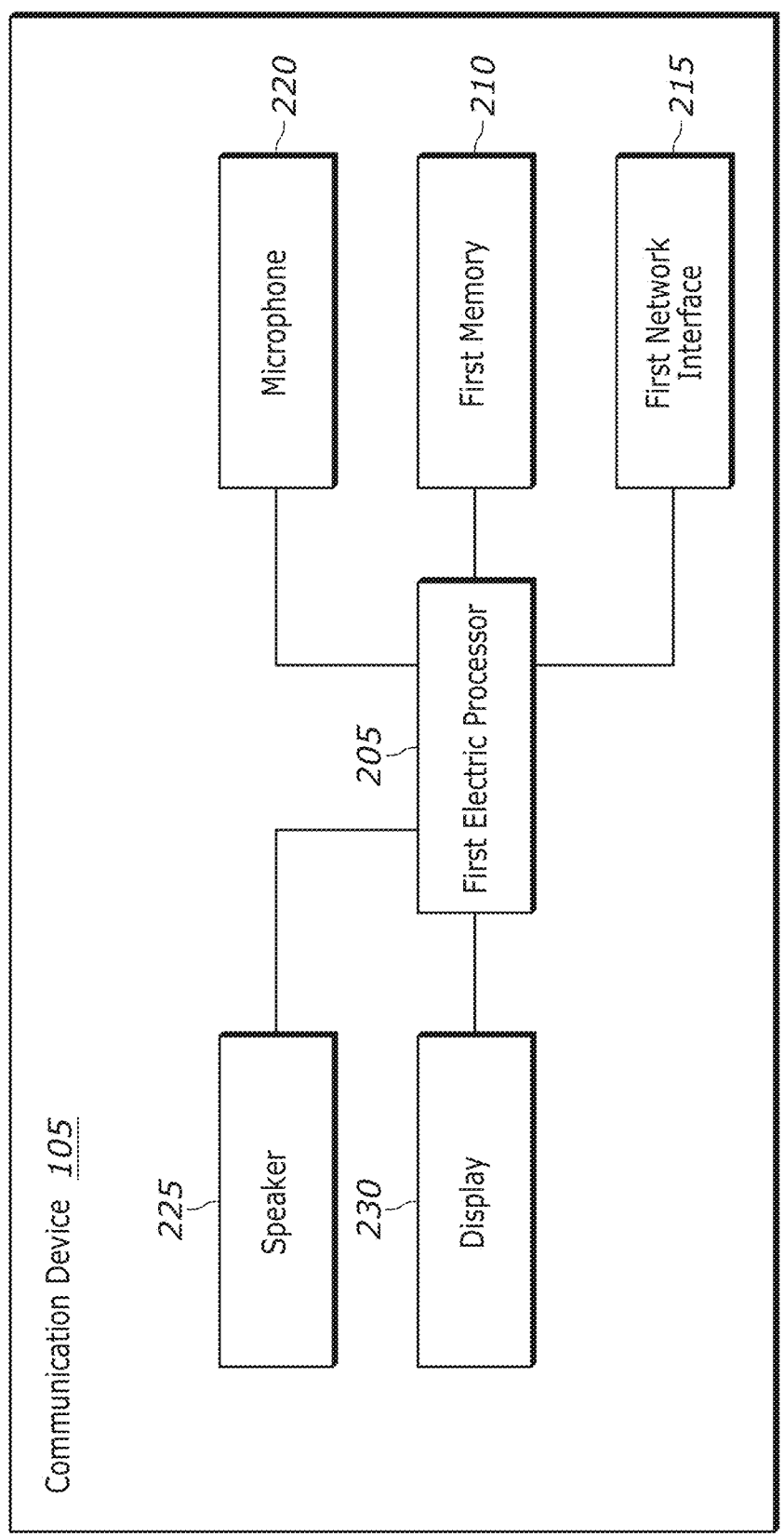
FIG. 2 is a block diagram of a communication device included in the communication system of FIG. 1 according to one example.

FIG. 2 is a block diagram of a communication device 105 according to one example. In the example illustrated, the communication device 105 includes a first electronic processor 205 (for example, a microprocessor or other electronic device). The first electronic processor 205 includes input and output interfaces (not shown) and is electrically coupled to a first memory 210, a first network interface 215, a microphone 220, a speaker 225, and a display 230. In some examples, the communication device 105 includes fewer or additional components in configurations different from that illustrated in FIG. 3. For example, the communication device 105 may additionally include a push-to-talk button and/or a camera. As another example, the communication device 105 may include one or more additional input devices, for example, a computer mouse and/or a keyboard that receive inputs from a user of the communication device 105. In some examples, the communication devices 105 transmit their respective location coordinates over the network 125 when placing a call to the call center 115 (for example, location information is stored as metadata associated with a call). Similarly, in some examples, the communication devices 105 also include a time stamp when placing a call such that the call center 115 may determine a time that the call was placed. In some examples, the communication device 105 includes one or more sensors that monitor a context of a user of the communication device 210 and may be referred to as context sensors. For example, the one or more sensors are biometric sensors that monitor one or more of a heart rate of the user, a body temperature of the user, a blood pressure of the user, and other biometric characteristics of the user. In some examples, the communication device 105 includes a location component (for example, a global positioning system receiver) configured to determine the geographic coordinates of the location of the communication device 105. In some examples, the communication device 210 performs functionality other than the functionality described below.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 sends and receives data to and from other devices in the system 100 (e.g., other communication devices 105, call taker devices 110, etc.) over the network 115 and/or via a direct-mode wireless link. In some examples, the first network interface 215 includes one or more transceivers for wirelessly communicating with the network 125 and/or the other devices directly. Alternatively or in addition, the first network interface 215 may include a connector or port for receiving a wired connection to the network 125, such as an Ethernet cable. The first electronic processor 205 may communicate one or more data feeds (for example, a video call, an audio call, an image, a text message, sensor input data gathered by one or more sensors of the communication device 105, and the like) over the network 125 through the first network interface 215 to other devices such as to a call taker device 110. The first electronic processor 205 may communicate data generated by the communication device 105 over the network 125 through the first network interface 215, for example, for receipt by one or more other devices in the system 100 (e.g., a call taker device 110). For example, the first electronic processor 205 receives electrical signals representing sound from the microphone 220 and may communicate information relating to the electrical signals over the network 125 through the first network interface 215 to other devices, for example, to a call taker device 110 to allow a caller to engage in a call with a call taker. Similarly, the first electronic processor 205 may output data received from the network 125 via the first network interface 215, for example from a call taker device 110, through the speaker 225, the display 230, or a combination thereof.

The display 230 displays images, video, text, and/or data from sensor inputs to the user (e.g., a caller). The display 230 may be a liquid crystal display (LCD) screen or an organic light emitting display (OLED) display screen. In some examples, a touch sensitive input interface may be incorporated into the display 230 as well, allowing the user to interact with content provided to the display 230. In some examples, the display 230 includes a projector or future-developed display technologies. In some examples, the speaker 225 and the display 230 are referred to as output devices that output data to a user of the communication device 105. In some examples, the microphone 220, a computer mouse, and/or a keyboard or a touch-sensitive display are referred to as input devices that receive input from a user of the communication device 105.

Figure 3:
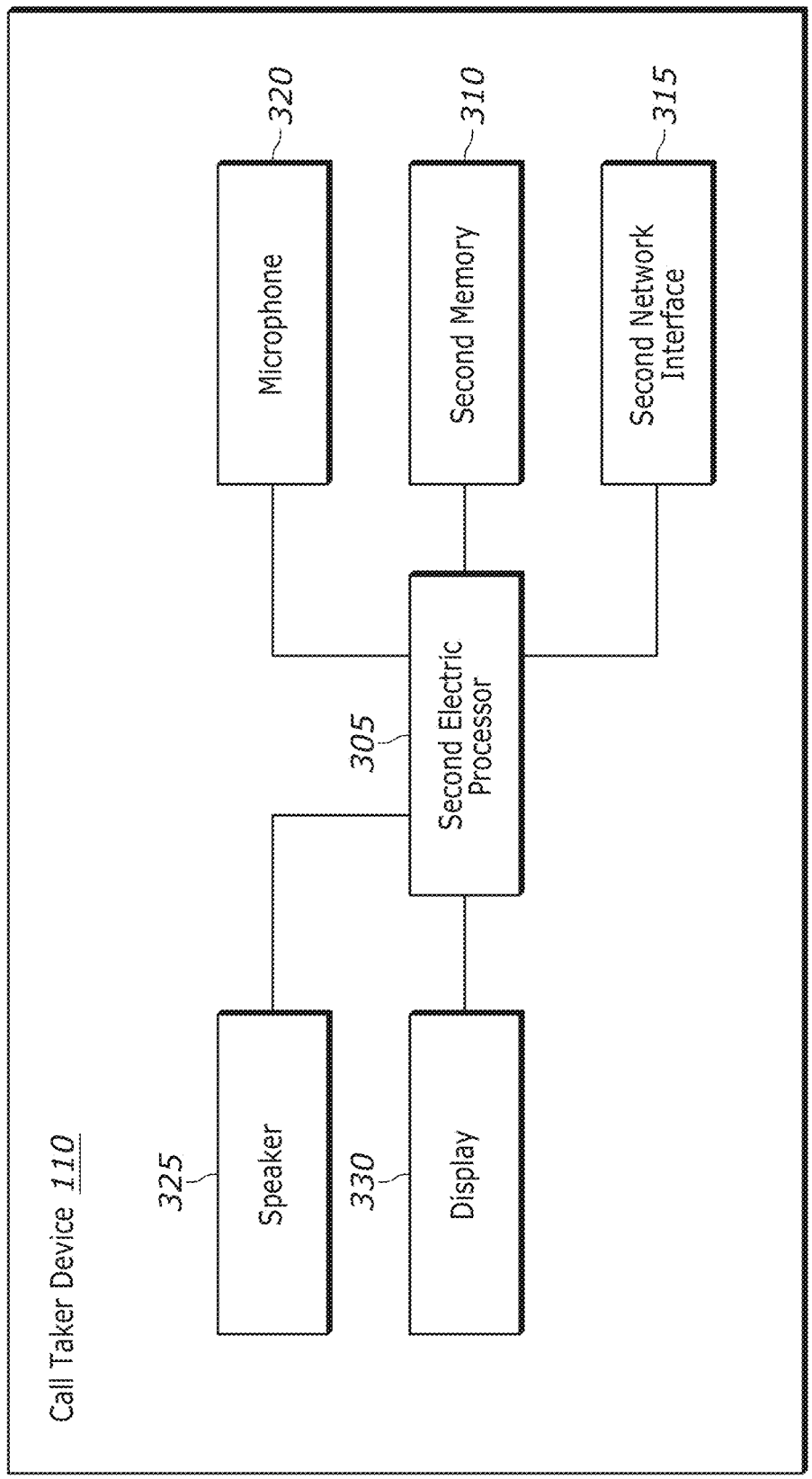
FIG. 3 is a block diagram of a call taker device included in the communication system of FIG. 1 according to one example.

FIG. 3 is a block diagram of a call taker device 110 according to one example. In the example shown, the call taker device 110 includes a second electronic processor 305 electrically connected to a second memory 310 and a second network interface 315. The second electronic processor 305 may also be electrically connected to a microphone 320, a speaker 325, and a display 330. These components are similar to the like-named components of the communication device 105 explained above with respect to FIG. 3 and function in a similar manner as described above. In some examples, the second network interface 315 sends and receives data to and from the communication devices 105 via the network 125 and/or via a direct-mode wireless link. In some instances, the call taker device 110 is a call taker work station that includes a computer with a monitor, keyboard, mouse or other user input, and/or the like. In some instances, the call taker device 110 includes a portable/hand-held device similar to some instances of the communication device 105. In some examples, the call taker device 110 includes fewer or additional components in configurations different from that illustrated in FIG. 3. For example, the call taker device 110 may additionally include a display such as a touch screen. In some examples, the call taker device 110 performs functionality other than the functionality described below.

In some examples, the call taker devices 110 are configured to receive calls and/or other data/data feeds (e.g., video calls, text messages, etc.) from communication devices 105 operated by citizens (for example, smart phones of citizens who have entered a user input to place a call to a substance abuse, mental health, and suicide and crisis prevention hotline by, for example, dialing 9-8-8). In some examples, each call taker device 110 is operated by a call taker (for example, a licensed psychologist or other specialist, a trained crisis prevention employee, a trained volunteer, a public safety officer, and/or the like).

In some instances, the call taker devices 110 at the call center 115 are communicatively linked with each other and/or to a call taker device monitoring device that may have similar components as a call taker device 110. Each call taker device 110 and/or the call taker device monitoring device may be configured to monitor ongoing calls (e.g., using natural language processing) to extract information from the ongoing calls.

In some examples, one or more call taker devices 110, the call taker device monitoring device, or a combination thereof may be referred to as an electronic computing device that performs the functionality described below. For example, the electronic computing device may be a single electronic processor (for example, the second electronic processor 305 of a single call taker device 110) or a plurality of electronic processors located in the single call taker device 110. In other examples, the electronic computing device includes multiple electronic processors distributed across different devices. For example, the electronic computing device is implemented on one or more of the second electronic processors 305 of the call taker devices 110, an electronic processor of the call taker device monitoring device, and/or one or more electronic processors located in one or more other devices located at the call center 110, at a remote location, or at a remote cloud-computing cluster.

As explained previously herein, there is a tension between (i) allowing callers to remain anonymous in order to encourage them to call for help and (ii) storing call history data and utilizing the call history data, for example, to route future calls to a proper specialist, to provide helpful background information to a call taker handling a future call, and/or the like. Thus, there is a technological problem with respect to storing call history data and providing call history data to a call taker in a manner that keeps the identity of a caller anonymous. To address this technological problem, the electronic computing device described above performs, in one instance, one or more of the methods (e.g., a method 400 of FIG. 4, a method 500 of FIG. 5, etc.) to control call taker access to historical call data in a manner according to permission granted by a caller.

Figure 4:
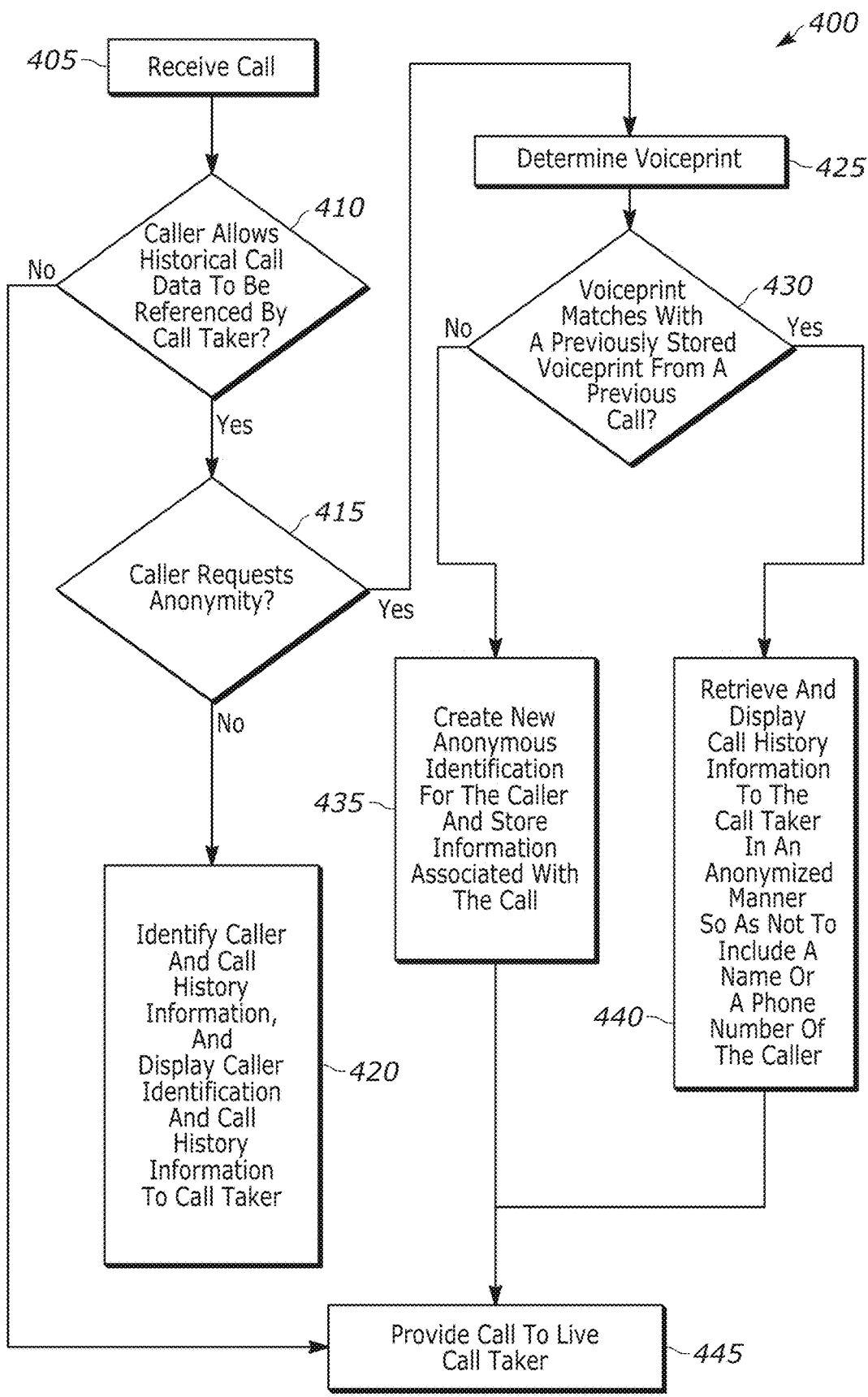
FIG. 4 is a flow chart of a method for controlling call taker access to historical call data in accordance with preferences of the caller according to one example.
Figure 5:
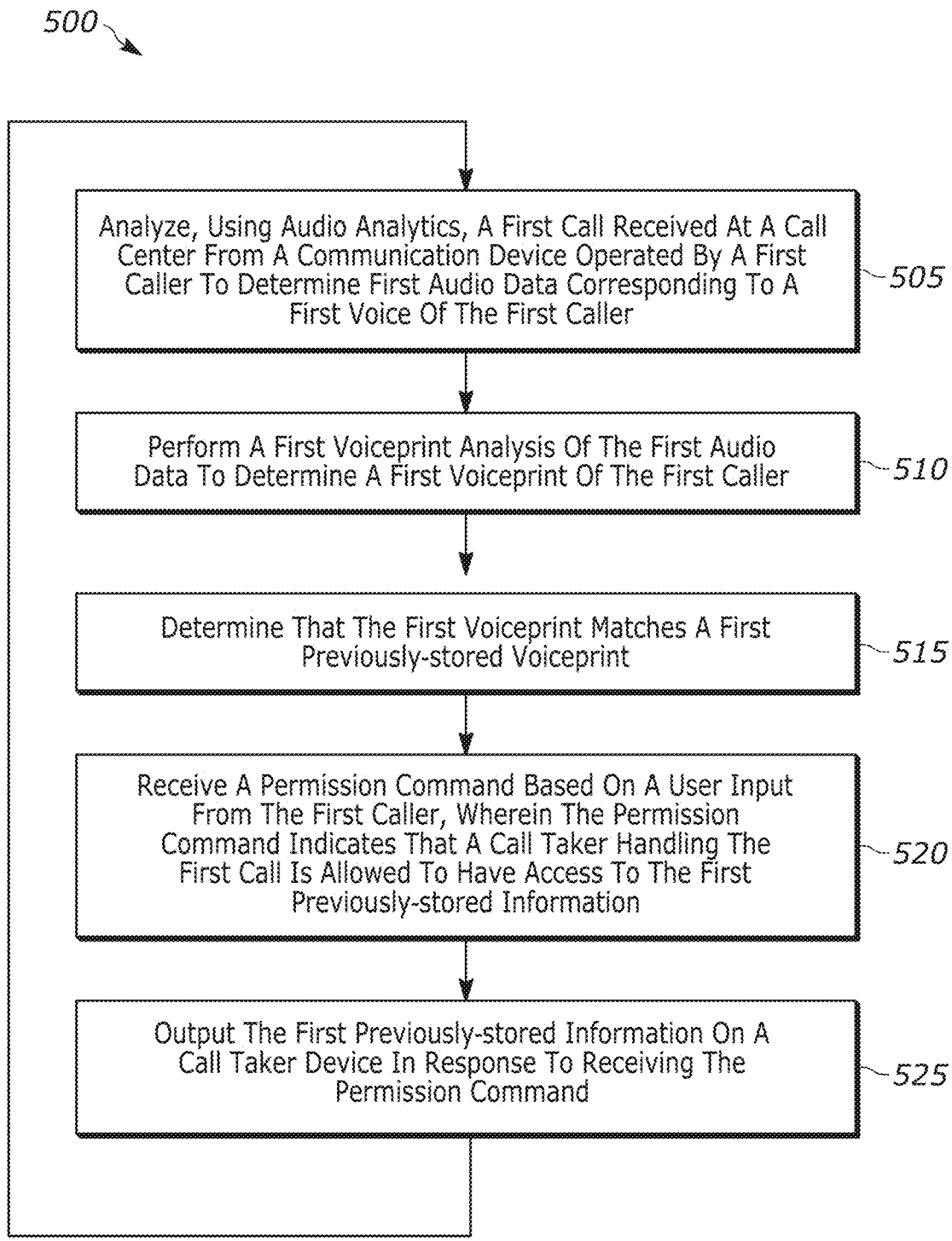
FIG. 5 is a flow chart of a method for retrieving and outputting anonymized call history data for consumption by a call taker in situations where the caller grants permission for anonymized call history data to be accessed during implementation of the method of FIG. 4 according to one example.

FIG. 4 illustrates a flow chart of the method 400, and FIG. 5 illustrates a flow chart of the method 500. While a particular order of processing steps, message receptions, and/or message transmissions is indicated in FIGS. 4 and 5 as an example, timing and ordering of such steps, receptions, and transmissions may vary where appropriate without negating the purpose and advantages of the examples set forth in detail throughout the remainder of this disclosure.

The method 400 of FIG. 4 indicates how a phone tree implemented by the electronic computing device may function to control call taker access to historical call data in accordance with preferences of the caller. The method 500 of FIG. 5 illustrates a flow chart of an example method of retrieving and outputting anonymized call history data for consumption by a call taker in situations where the caller grants permission for anonymized call history data to be accessed during implementation of the phone tree of the method 400 of FIG. 4.

At block 405, the electronic computing device (e.g., a call taker device 110) may receive a call from a first caller. Before providing the call to a live call taker to allow the call taker to speak with the first caller, the electronic computing device may implement a phone tree to ask the first caller questions and receive responses to the questions (e.g., audible responses determined by using natural language processing to analyze audio data, responses received via the first caller pressing one or buttons on their communication device 105, and/or the like).

At block 410, the electronic computing device determines whether the first caller will allow historical call data to be referenced by a call taker. In some instances, the electronic computing device is configured to execute the phone tree in response to receiving the first call. Executing the phone tree may include requesting, with an automated voice message, an automated text message, or both the automated voice message and the automated text message, a permission command from the first caller to allow the call taker handling the first call to have access to the first previously-stored information/historical call data. For example, the phone tree may be implemented such that the electronic computing device audibly asks the first caller, "Would you like to grant the call taker access to information associated with previous calls that you have placed to this number to better assist your current call?"

When the first caller responds by indicating that they do not want the call taker to access their historical call data, the method 400 proceeds to block 445 to provide the call to a live call taker to allow the live call taker to speak with the first caller. In this situation, historical call data of the first caller may not be accessed or displayed to the call taker because the first caller did not grant permission for their historical call data to be accessed and/or displayed.

Returning to block 410, when the first caller responds by indicating that they will allow the call taker to access their historical call data, the method 400 proceeds to block 415. At block 415, the electronic computing device determines whether the first caller would like their historical data to be anonymized to prevent the call taker from knowing at least some identifying information about the first caller. For example, the phone tree may be implemented such that the electronic computing device audibly asks the first caller, "Would you like to keep your historical call data and your identity anonymous?"

When the first caller responds by indicating that they do not want to remain anonymous, the method 400 proceeds to block 420. At block 420, the electronic computing device identifies the caller (e.g., using phone number identification, voiceprint analysis, and/or the like) and call history information associated with the caller. The electronic computing device also electronically routes the caller identification and the call history information to the display 330 associated with the call taker to aid the call taker in providing assistance to the first caller. The method 400 then proceeds to block 445 to provide the call to a live call taker to allow the live call taker to speak with the first caller.

In some instances, the display 330 of the call taker device 110 may display an indication that a call from the first caller has been assigned to the call taker. The indication also may indicate that call history information is available with respect to the first caller and that the first caller granted permission for the call taker to access the call history information. Nevertheless, in some instances, the second electronic processor 305 may refrain from allowing the call history information to be displayed until the call taker re-confirms that permission has been granted by the first caller. For example, the call taker may verbally re-ask the first caller that they do not wish to be anonymous and/or that their call history information is accessible. In response receiving another permission command from the first caller that grants permission for the call taker to access the call history information (e.g., as determined by natural language processing), the second electronic processor 305 may allow the call history information of the first caller to be displayed, for example, in response to the call taker clicking a link to display the call history information on the display 330.

Returning to block 415, when the first caller responds by indicating that they want to remain anonymous, the method 400 proceeds to block 425 to determine a first voiceprint of the first caller (e.g., as explained in greater detail below with respect to block 510 of FIG. 5). At block 430, the electronic computing device determines whether the first voiceprint matches with a previously stored voiceprint from one or more previous calls (e.g., as explained in greater detail with respect to block 515 of FIG. 5). In this situation, at least some identifying information of the first caller can remain anonymous (e.g., a name of the first caller, a phone number of the first caller, an address or probable address from which the first caller is calling, a location from which the first caller is calling, and/or combinations thereof). Rather, the voiceprint of the first caller is used as the identifying characteristic of the first caller such that the above-noted identifying information may not be stored and/or displayed to the call taker.

When the first voiceprint does not match any previously stored voiceprints from any previous calls, at block 435, the electronic computing device creates a new anonymous identification for the first caller and stores information associated with the first voiceprint and the call in the database 120 linked to the new anonymous identification. On the other hand, when the first voiceprint matches a previously stored voiceprint from a previous call, at block 440, the electronic computing device retrieves call history information from the database 120. The electronic computing device also displays the call history information to a call taker in an anonymized manner so as not to include at least some identifying information of the first caller such as a name or a phone number of the first caller. The displayed call history information may aid the call taker in providing assistance to the first caller while keeping at least some identification information of the first caller anonymous.

After performing block 435 or block 440, the method 400 proceeds to block 445 to provide the call to a live call taker to allow the live call taker to speak with the first caller.

With reference to FIG. 5, the method 500 is an example method of retrieving and outputting anonymized call history data for consumption by a call taker in situations where the caller grants permission for anonymized call history data to be accessed during implementation of the phone tree of the method 400 of FIG. 4.

At block 505, the electronic computing device analyzes, using audio analytics, a first call received at a call center 115 from a communication device 105 operated by a first caller to determine first audio data corresponding to a first voice of the first caller. For example, the electronic computing device may use a machine learning algorithm, a voice recognition technique, and/or other audio analytics techniques to determine the first audio data that corresponds to the first voice of the first caller. The electronic computing device may be able to distinguish between multiple voices during a call (e.g., between multiple callers on the same call, between a caller and a call taker, etc.).

At block 510, the electronic computing device performs a first voiceprint analysis of the first audio data to determine a first voiceprint of the first caller. In some instances, the electronic computing device may process the first audio data corresponding to the first voice of the first caller to determine a sound, a rhythm, a frequency, a pattern, the like, and/or combinations thereof that define the first voiceprint of the first caller. In some instances, the first audio data is gathered while a phone tree implemented by the electronic computing device prompts the first caller to say a word or phrase in order to allow for voice print analysis/identification. For example, the phone tree may request that the caller say the same word or phrase each time that a call is received so that the voiceprint analysis is consistent between different calls and callers. In some instances, the voiceprint analysis may occur without the phone tree requesting a specific word or phrase to be stated by the caller. In other words, voiceprint analysis may occur during the caller's verbal responses to the phone tree and/or during conversation with the call taker. In some instances, the electronic computing device may be able to distinguish between the caller's voice and the call taker's voice, for example, because a voiceprint of the call taker may be known and stored previously.

At block 515, the electronic computing device determines that the first voiceprint matches a first previously-stored voiceprint. In some instances, the electronic computing device may determine that the first voiceprint matches a first previously-stored voiceprint in response to determining that the first voiceprint and the first previously-stored voiceprint match each other by more than a predetermined threshold (e.g., 90%, 95%, 99%, or the like). In some instances, the electronic computing device communicates with the database 120 that stores a plurality of previously stored voiceprints from previous calls. The electronic computing device may search the database 120 or send a search request to the database 120 to attempt to determine whether the first voiceprint matches a previously-stored voiceprint stored in the database 120.

In some instances, the first previously-stored voiceprint identifies and is associated with first previously-stored information regarding a previous call from the first caller. For example, the previously-stored information may be call history information including, but not limited to, a telephone number of the first caller, a name of the first caller, one or more addresses of the first caller, one or more locations from which the first caller has previously called, dates and/or times at which the first caller has previously called, types/categories of previous calls (e.g., depression-related, suicide-related, substance abuse-related, and/or the like), notes/information entered by one or more call takers during previous calls with the first caller, outcomes of previous calls placed by the first caller, a criminal history of the first caller, health information of the first caller as noted from previous calls with the first caller's permission (e.g., whether the first caller had previously sought professional help and from what type of professional/specialist), and/or the like. In some instances, notes/information entered by one or more call takers during previous calls may include an agitation level of the first caller, phrases and/or topics to which the first caller responded positively and/or negatively, word choice of the first caller, whether the first caller seemed to present a clear and present danger to themselves or others, the like, and combinations thereof.

While in some instances, the previously-stored information/call history information stored in the database 120 may include identifying information of the first caller such as name, phone number, address, and/or location, in some instances, the first previously-stored information/call history information is anonymized so as not to include a name of the first caller or a phone number of the first caller. In some instances, the first previously-stored information/call history information is anonymized so as not to include an address of the first call or a location from which the first caller called. In some instances, the database 120 may not store the identifying information (or at least some of the identifying information) at all. Rather, the other previously-stored information that may not be considered to be identifying information (e.g., types/categories of previous calls, notes/information entered by one or more call takers during previous calls with the first caller, outcomes of previous calls placed by the first caller, a criminal history of the first caller, health information of the first caller, and/or the like) may be uniquely searchable/identifiable within the database 120 only through its association with a matching voiceprint upon receiving a later call with the matching voiceprint. In some instances, the database 120 may store at least some identifying information of the first caller but may not display such identifying information to the call taker or any other entity unless the first caller gives permission for the identifying information to be displayed/shared.

At block 520, the electronic computing device receives a permission command based on a user input from the first caller. The permission command may indicate that a call taker handling the first call is allowed to have access to at least some of the first previously-stored information/call history information associated with the matching voiceprint of the first caller. The permission command may be received during any point of the first call. For example, the permission command may be received at block 410 or block 415 of FIG. 4 during implementation of a phone tree before the call has been transferred to a live call taker and/or before it is known if a matching voiceprint with previous call information even exists in the database 120. As another example, the permission command may be received during a verbal interaction with the live call taker (e.g., if the first caller initially refuses to grant permission but changes their mind after communicating with the call taker). In some instances, the electronic computing device (e.g., the call taker device 110) is configured to refrain from outputting the first previously-stored information associated with the first caller on the call taker device 110 unless and until the permission command is received.

As indicated previously herein, the user input (e.g., a caller's response to a prompt from the phone tree or the call taker) may be a verbal command/response from the first caller and/or may be user actuation of a button on the communication device 105. The electronic computing device may monitor and analyze verbal responses from the first caller, for example, using audio analytics and/or natural language processing, to determine whether (i) the permission command was received (i.e., permission was granted), (ii) an explicit response refusing permission was received (i.e., permission was denied), or (iii) the response was unclear or no response was received at all. The electronic computing device may receive an indication from the communication device 105 of whether the first caller pressed certain buttons (e.g., "1" or "2") in response to a phone tree prompt asking the first caller to press "1" to grant permission to use call history information or to press "2" to refuse permission to use call history information.

Figure 6A:
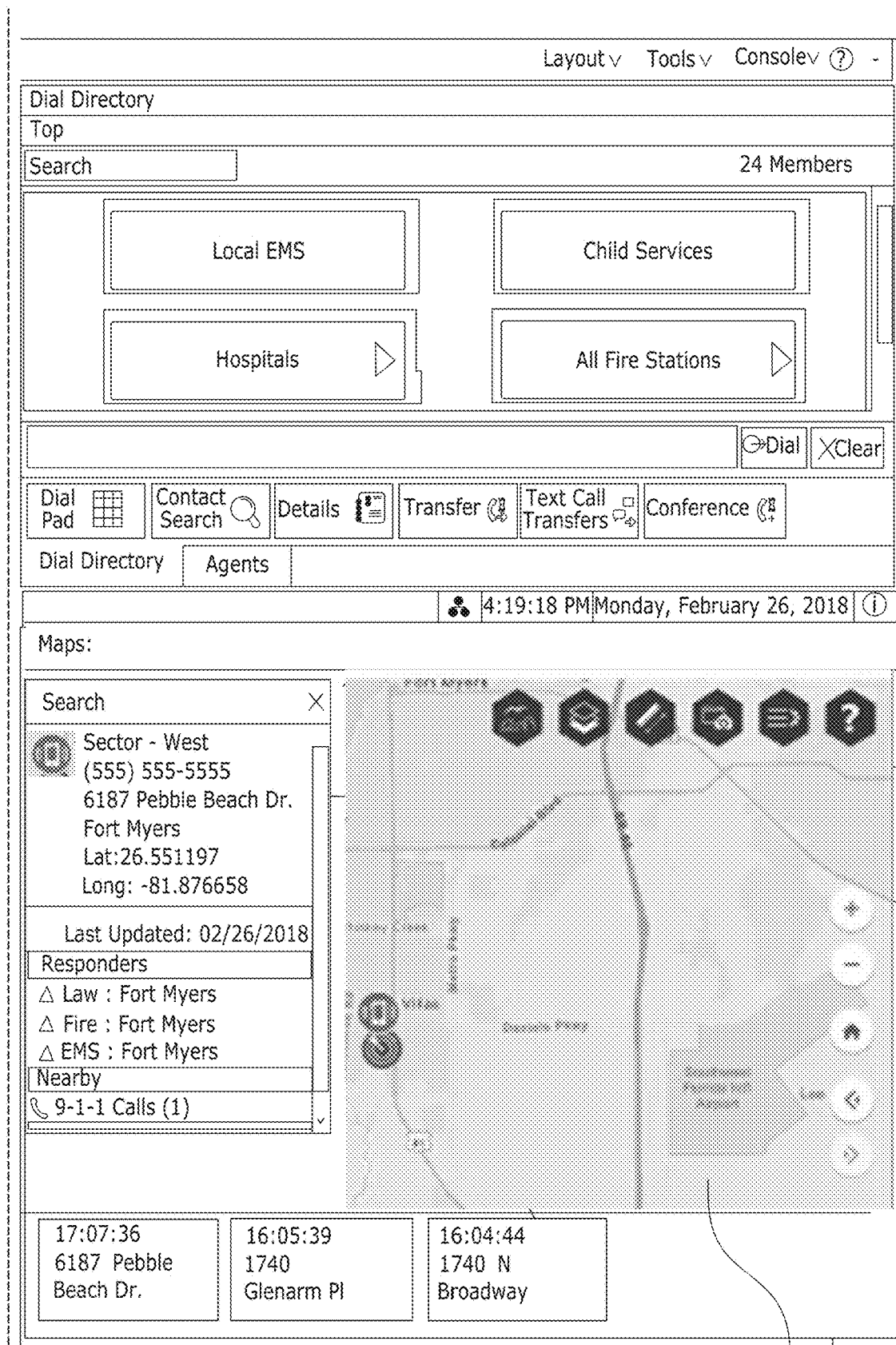
FIG. 6A illustrates a user interface that may be displayed on the call taker device of FIG. 3 in some situations according to one example.

At block 525, the electronic computing device outputs the first previously-stored information on a call taker device 110 in response to receiving the permission command. For example, FIG. 6A illustrates a user interface 605 that may be displayed on the display 330 of the call taker device 110 in a situation where the call taker device 110 has received a permission command that does not provide any limitations on previously stored information that can be accessed by the call taker. In other words, the call taker may have complete access to all previously stored information associated with the first caller (i.e., associated with a first voiceprint of the first caller).

As shown in FIG. 6A, the previously stored information displayed on the user interface 605 may include identifying information 610 that includes a name of the caller, a phone number from which the caller is calling, a location from which the caller is calling, and a probable address of the caller. The displayed information may also include notes 615 from previous calls with the caller and/or a log 620 of previous calls. The displayed information may also include a map 625 that indicates an approximate location of the communication device 105 from which the caller is calling. The displayed information may also include medical information 630 about the caller and/or other types of information about the caller. The user interface 605 may also include other windows/text boxes to allow the call taker to view additional information or perform other tasks (e.g., additional information about the call, a text message window, a dial directory to contact other agencies/organizations, and/or the like). In some instances, the user interface 605 (and/or user interface 650 of FIG. 6B) may include portions/areas where the call taker may enter information (e.g., take notes about an ongoing call). For example, the notes 615 from previous calls may also include an area where notes about a current call may be entered by the call taker. In some instances, the user interfaces 605, 650 may include a separate textbox or area for the call taker to enter notes and/or other information.

Figure 6B:
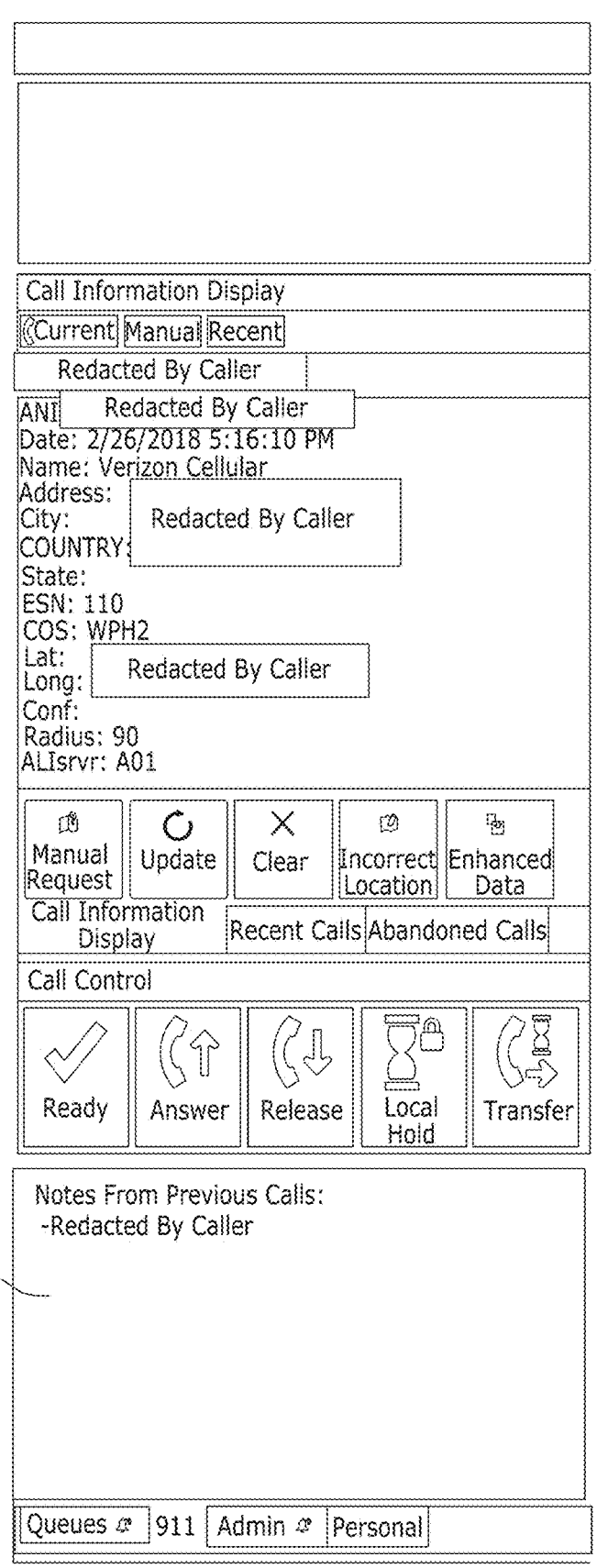
FIG. 6B illustrates another user interface that may be displayed on the call taker device of FIG. 3 in some situations according to one example.
Figure 6B:
Figure 6B:
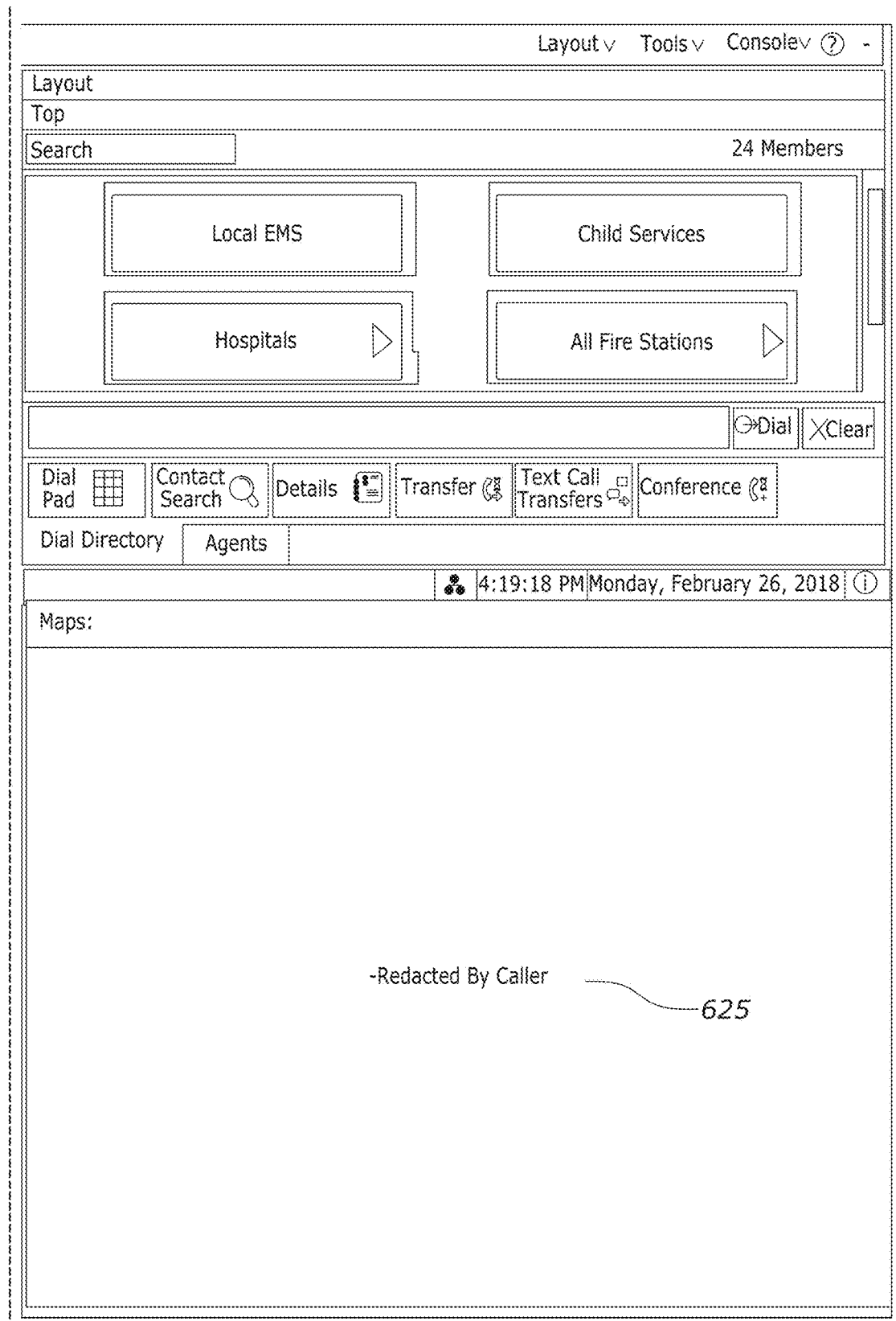

On the other hand, FIG. 6B illustrates a user interface 650 that may be displayed on the display 330 of the call taker device 110 in a situation where the call taker device 110 has not received a permission command or has received a permission command that provides limitations on previously-stored information that can be accessed by the call taker. In other words, the call taker may not have complete access or any access to previously stored information associated with the first caller (i.e., with a first voiceprint of the first caller).

As shown in FIG. 6B, some or all of the previously stored information that is displayed on the user interface 605 of FIG. 6A is no longer displayed on the user interface 650 of FIG. 6A. Rather, this information is indicated to be "REDACTED BY THE CALLER" such that at least some identifying information about the caller is anonymized. In other words, at least some of the previously stored identifying information of the caller is not displayed in FIG. 6B in accordance with caller preferences. In some instances, the redacted information may simply not be shown instead of being shown with an indication that the information has been "REDACTED BY THE CALLER." However, the indication/label that information has been "REDACTED BY THE CALLER" may indicate to the call taker that previously stored information is available regarding at least one previous call made by the caller. In some instances, the call taker device 110 may more explicitly indicate that that a matching voiceprint exists but that the caller has not provided permission for the call taker to access previously stored information from previous calls. For example, the electronic computing device may be configured to output, in response to (i) determining that the first voiceprint matches a first previously-stored voiceprint and (ii) not receiving the permission command, a notification on the call taker device 110 that indicates that (i) the first voiceprint matches the first previously-stored voiceprint and (ii) that the first caller has not provided the permission command to allow the call taker handling the first call to have access to the first previously-stored information. In some instances, the notification may also indicate whether the caller actively refused permission to access the first previously-stored information or merely did not affirmatively provide the permission command to access the first-previously-stored information. Such an indication may be used by the call taker to decide whether to follow up with the caller regarding whether the first previously-stored information can be accessed to potentially improve service provided by the call taker to the caller. In some instances, the notification may allow the call taker to decide whether to suggest that the call be switched to another call taker that previously spoke with the caller, if desired by the caller and if the another call taker is available.

In some instances, the permission command received by the electronic device from the first caller may indicate that at least some of the previously-stored information regarding the first caller is not accessible. In some instances, the permission command may indicate (i) that a first portion of the first previously-stored information can be accessed by the call taker and (ii) that a second portion of the first previously-stored information cannot be accessed by the call taker. For example, the phone tree implemented by the electronic computing device may ask the caller if they would like to specify certain types of information that are accessible and may accordingly make each type of information accessible or not accessible to the call taker. As one example with reference to FIG. 6A, the permission command (which may include a plurality of permission commands) may indicate that notes 615 from previous calls, a log 620 of previous calls, and a map 625/location of the caller's current location are accessible while identifying information 610 and medical information 630 are not accessible. The permission command may also indicate that certain previously-stored information is accessible or not accessible to the call taker based on a date range associated with the previously-stored information, based on types of incidents related to the previously-stored information (e.g., some types of incidents are accessible [such as other calls related to the same incident] while other types of incidents are not), based on other people mentioned within the previously-stored information (e.g., previous calls/notes that mentioned certain people are accessible or not accessible), and/or the like. In some instances, in response to the caller indicating that they would like to specify certain types of information that are accessible, the phone tree may ask individual questions about each of a plurality of types of information and allow the caller to provide a response (e.g., a verbal response, a user input via a keypad, etc.) for each type of information. In some instances, the phone tree may assign one or more types of information to a numerical value corresponding to the buttons on the communication device 105 and request that the user press all buttons corresponding to information that is allowed to be accessible by the call taker.

In some instances, the electronic computing device (e.g., the call taker device 110) is configured to transmit the first previously-stored information to the communication device 105 operated by the first caller. For example, during implementation of the phone tree, the call taker device 110 may provide a secure link to the communication device 105 (in a text message) that allows the communication device 105 to display types of stored information and/or the stored information itself. The call taker device 110 may then receive, from the communication device 105 of the first caller, a redacted version of the first previously-stored information that indicates at least some information that cannot be displayed to the call taker. The call taker device may then receive the permission command based on the user input from the first caller. The permission command may indicate that the call taker is allowed to have access to redacted version of the first previously-stored information such that only the unredacted portions of the redacted version of the first previously-stored information are accessible/viewable by the call taker on the call taker device 110. The call taker device may output the redacted version of the first previously-stored information on the call taker device 110 (e.g., on the display 330 in a similar manner as shown in FIGS. 6A and 6B).

FIGS. 6A and 6B each have been separated into three different portions into order to show the user interfaces 605 and 650 in sufficient detail. The dashed lines on the sides of each portion indicate that, while the portions of each user interface 605, 650 are shown separately in order to show sufficient detail, the portions may be part of a single respective user interface 605, 650 that may be displayed on one or more displays 330 of the call taker device 110.

In some instances, the permission command indicates (i) that the first previously-stored information can be accessed by the call taker when the call taker has a first role and (ii) that the first previously-stored information cannot be accessed by the call taker when the call taker has a second role different than the first role. For example, the permission command may grant access to the call taker to view some or all previously-stored information associated with the caller when the call taker is a licensed psychologist or other licensed specialist but not when the call taker has another role (e.g., a trained volunteer). In some instances, the call taker device 110 determines a role of the call taker based on user sign-in information that is entered by the call taker in order to receive calls on the call taker device 110. In some instances, in response to the caller indicating that they would like to specify certain roles of call takers that are allowed to access their call history information, the phone tree may ask individual questions about each of a plurality of roles of call takers and allow the caller to provide a response (e.g., a verbal response, a user input via a keypad, etc.) for each role. In some instances, the phone tree may assign one or more roles of call takers to a numerical value corresponding to the buttons on the communication device 105 and request that the user press all buttons corresponding to roles of call takers that are allowed to access their call history information.

In some instances, the voiceprint of a caller may not match any voiceprints stored in the database. Accordingly, as mentioned with respect to block 435 of FIG. 4, the electronic computing device may store information corresponding to the new voiceprint and information associated with the call in the database 120 for future use. For example, the electronic computing device may analyze, using audio analytics, a previous call received at the call center 115 from the first caller (e.g., a first call placed by the first caller to the crisis prevention hotline) to determine second audio data corresponding to the first voice of the first caller. The electronic computing device may then perform a second voiceprint analysis of the second audio data to determine the first voiceprint of the first caller. The electronic computing device may then determine that the first voiceprint does not match any previously-stored voiceprints (e.g., stored in the database 120). In response to determining that the first voiceprint does not match any of the previously-stored voiceprints, the electronic computing device may store the first voiceprint and information regarding the previous call in a memory (e.g., in the database 120, in the second memory 310, and/or the like) in an anonymized manner such that the information regarding the previous call is identifiable using the first voiceprint but is not identifiable using at least some identifying information of the first caller such as the name of the first caller and/or the phone number of the first caller.

In some instances, the electronic computing device may not initially store the caller's voiceprint and information associated with their first call (or another previous call) unless the caller provides a permission command indicating that such information can be stored for future use. For example, the electronic computing device may receive a second permission command based on a second user input from the first caller. The second permission command may indicate that the first voiceprint and the information regarding the previous call (which may be a current call at the time the second permission command is received) can be stored by the electronic computing device. The electronic computing device may store the first voiceprint and the information regarding the previous call in the memory (e.g., in the database 120, in the second memory 310, and/or the like) in response to receiving the second permission command. The second permission command may also indicate whether the information stored about the caller and their call(s) should be stored in an anonymous manner (e.g., so as to be identifiable by voiceprint but not by at least some other identifying information) or can be stored in a non-anonymous manner where the information is identifiable using at least some identifying information besides the voiceprint of the caller. Additionally, the second permission command may indicate whether stored information about the caller and their call(s) may be used in the future only specifically with future calls of the same caller or generally with future calls of other callers. For example, it may be useful for call takers handling calls from other callers with similar situations as the first caller to use notes from calls with the first caller to utilize strategies that were useful in calming or helping the first caller. When such information is used by call takers for other callers, the information may be provided to the call taker anonymously so as to prevent at least some identifying information of the first caller from being displayed to the call taker who is handling a call from another caller.

In some instances, the electronic computing device may anonymously store call history data with respect to a received call even when the caller has indicated that they would prefer that such information not be stored. Such information may be stored in case the caller changes their mind during the call or during a future call. Such information may be stored anonymously (e.g., identifiable by voiceprint and not by other identifying information such as name, phone, etc.) so as not to violate the privacy of the caller. Such information that is stored anonymously may include a date/time of the call, a type of incident to which the first call relates, notes entered by the call taker, any other examples of information mentioned previously herein, the like, and combinations thereof.

In some instances, even if a repeat caller has given permission in the past for their information to be accessed, the electronic computing device may nevertheless refrain from outputting previously-stored information regarding the caller and their previous call(s) on the call taker device 110 unless and until a permission command is received again during the current call. In some instances, the caller may revoke the permission command at any time (e.g., verbally or by pressing a certain button a keypad such as the number "7"). Accordingly, as indicated throughout the disclosure, the caller has control over access to their own information (e.g., whether their information is not accessible, accessible only anonymously, accessible with at least some identifying being anonymized, and/or fully accessible).

In the foregoing specification, certain examples, embodiments, aspects, and features have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. An electronic computing device comprising:
an electronic processor configured to
analyze, using audio analytics, a first call received at a call center from a communication device operated by a first caller to determine first audio data corresponding to a first voice of the first caller,
perform a first voiceprint analysis of the first audio data to determine a first voiceprint of the first caller,
determine that the first voiceprint matches a first previously-stored voiceprint, wherein the first previously-stored voiceprint identifies and is associated with first previously-stored information regarding a previous call from the first caller, and wherein the first previously-stored information is anonymized so as not to include a name of the first caller or a phone number of the first caller and so as to be identifiable using the first voiceprint but not identifiable using the name of the first caller or the phone number of the first caller,
receive a permission command based on a user input from the first caller, wherein the permission command indicates that a call taker handling the first call is allowed to have access to the first previously-stored information, and wherein the user input from the first caller is received during the first call and in response to a prompt from the call taker or the electronic processor, and
output the first previously-stored information on a call taker device in response to receiving the permission command.

2. The electronic computing device of claim 1, wherein the electronic processor is configured to refrain from outputting the first previously-stored information on the call taker device unless and until the permission command is received.

3. The electronic computing device of claim 1, wherein the electronic processor is configured to output, in response to (i) determining that the first voiceprint matches the first previously-stored voiceprint and (ii) not receiving the permission command, a notification on the call taker device that indicates that (i) the first voiceprint matches the first previously-stored voiceprint and (ii) that the first caller has not provided the permission command to allow the call taker handling the first call to have access to the first previously-stored information.

4. The electronic computing device of claim 1, wherein the electronic processor is configured to:
analyze, using audio analytics, the previous call received at the call center from the first caller to determine second audio data corresponding to the first voice of the first caller;
perform a second voiceprint analysis of the second audio data to determine the first voiceprint of the first caller;
determine that the first voiceprint does not match any previously-stored voiceprints; and
in response to determining that the first voiceprint does not match any of the previously-stored voiceprints, store the first voiceprint and information regarding the previous call in a memory in an anonymized manner such that the information regarding the previous call is identifiable using the first voiceprint but is not identifiable using the name of the first caller or the phone number of the first caller.

5. The electronic computing device of claim 4, wherein the electronic processor is configured to:

receive a second permission command based on a second user input from the first caller, wherein the second permission command indicates that the first voiceprint and the information regarding the previous call can be stored in the memory; and store the first voiceprint and the information regarding the previous call in the memory in response to receiving the second permission command.

6. The electronic computing device of claim 1, wherein the permission command indicates (i) that a first portion of the first previously-stored information can be accessed by the call taker and (ii) that a second portion of the first previously-stored information cannot be accessed by the call taker.

7. The electronic computing device of claim 1, wherein the permission command indicates (i) that the first previously-stored information can be accessed by the call taker when the call taker has a first role and (ii) that the first previously-stored information cannot be accessed by the call taker when the call taker has a second role different than the first role.

8. The electronic computing device of claim 1, wherein the electronic processor is configured to execute a phone tree in response to receiving the first call, wherein executing the phone tree includes outputting the prompt by requesting, with an automated voice message, an automated text message, or both the automated voice message and the automated text message, the permission command from the first caller to allow the call taker handling the first call to have access to the first previously-stored information.

9. The electronic computing device of claim 1, wherein the electronic processor is configured to:
transmit the first previously-stored information to the communication device operated by the first caller;
receive, from the communication device of the first caller, a redacted version of the first previously-stored information;
receive the permission command based on the user input from the first caller, wherein the permission command indicates that the call taker is allowed to have access to the redacted version of the first previously-stored information; and
output the redacted version of the first previously-stored information on the call taker device.

10. A method of controlling access to historical call data, the method comprising:
analyzing, with an electronic processor and using audio analytics, a first call received at a call center from a communication device operated by a first caller to determine first audio data corresponding to a first voice of the first caller;
performing, with the electronic processor, a first voiceprint analysis of the first audio data to determine a first voiceprint of the first caller;
determining, with the electronic processor, that the first voiceprint matches a first previously-stored voiceprint, wherein the first previously-stored voiceprint identifies and is associated with first previously-stored information regarding a previous call from the first caller, and wherein the first previously-stored information is anonymized so as not to include a name of the first caller or a phone number of the first caller and so as to be identifiable using the first voiceprint but not identifiable using the name of the first caller or the phone number of the first caller;
receiving, with the electronic processor, a permission command based on a user input from the first caller, wherein the permission command indicates that a call taker handling the first call is allowed to have access to the first previously-stored information, and wherein the user input from the first caller is received during the first call and in response to a prompt from the call taker or the electronic processor, and
outputting, with the electronic processor, the first previously-stored information on a call taker device in response to receiving the permission command.

11. The method of claim 10, further comprising refraining, with the electronic processor, from outputting the first previously-stored information on the call taker device unless and until the permission command is received.

12. The method of claim 10, further comprising outputting, in response to (i) determining that the first voiceprint matches the first previously-stored voiceprint and (ii) not receiving the permission command, a notification on the call taker device that indicates that (i) the first voiceprint matches the first previously-stored voiceprint and (ii) that the first caller has not provided the permission command to allow the call taker handling the first call to have access to the first previously-stored information.

13. The method of claim 10, further comprising:
analyzing, with the electronic processor and using audio analytics, the previous call received at the call center from the first caller to determine second audio data corresponding to the first voice of the first caller;
performing, with the electronic processor, a second voiceprint analysis of the second audio data to determine the first voiceprint of the first caller;
determining, with the electronic processor, that the first voiceprint does not match any previously-stored voiceprints; and
in response to determining that the first voiceprint does not match any of the previously-stored voiceprints, storing, with the electronic processor, the first voiceprint and information regarding the previous call in a memory in an anonymized manner such that the information regarding the previous call is identifiable using the first voiceprint but is not identifiable using the name of the first caller or the phone number of the first caller.

14. The method of claim 13, further comprising:
receiving, with the electronic processor, a second permission command based on a second user input from the first caller, wherein the second permission command indicates that the first voiceprint and the information regarding the previous call can be stored in the memory; and
storing, with the electronic processor, the first voiceprint and the information regarding the previous call in the memory in response to receiving the second permission command.

15. The method of claim 10, wherein the permission command indicates (i) that a first portion of the first previously-stored information can be accessed by the call taker and (ii) that a second portion of the first previously-stored information cannot be accessed by the call taker.

16. The method of claim 10, wherein the permission command indicates (i) that the first previously-stored information can be accessed by the call taker when the call taker has a first role and (ii) that the first previously-stored information cannot be accessed by the call taker when the call taker has a second role different than the first role.

17. The method of claim 10, further comprising executing, with the electronic processor, a phone tree in response to receiving the first call, wherein executing the phone tree includes outputting the prompt by requesting, with an automated voice message, an automated text message, or both the automated voice message and the automated text message, the permission command from the first caller to allow the call taker handling the first call to have access to the first previously-stored information.

18. The method of claim 10, further comprising:
transmitting, via a network interface, the first previously-stored information to the communication device operated by the first caller;
receiving, via the network interface and from the communication device of the first caller, a redacted version of the first previously-stored information;
receiving, with the electronic processor, the permission command based on the user input from the first caller, wherein the permission command indicates that the call taker is allowed to have access to the redacted version of the first previously-stored information; and
outputting, with the electronic processor, the redacted version of the first previously-stored information on the call taker device.

19. An electronic computing device comprising:
an electronic processor configured to
analyze, using audio analytics, a first call received at a call center from a communication device operated by a first caller to determine first audio data corresponding to a first voice of the first caller,
perform a first voiceprint analysis of the first audio data to determine a first voiceprint of the first caller,
determine that the first voiceprint does not match any previously-stored voiceprints, and
in reponse to determining that the first voiceprint does not match any of the previously-stored voiceprints, store the first voiceprint and information regarding the first call in a memory in an anonymized manner such that the information regarding the first call is identifiable using the first voiceprint but is not identifiable using a name of the first caller or a phone number of the first caller.

20. The electronic computing device of claim 19, wherein the electronic processor is configured to:
analyze, using audio analytics, a second call received at the call center from the first caller to determine second audio data corresponding to the first voice of the first caller;
perform a second voiceprint analysis of the second audio data to determine a second voiceprint of the first caller;
determine that the second voiceprint matches the first voiceprint that was previously stored in the memory;
identify the information regarding the first call in response to determining that the second voiceprint matches the first voiceprint that was previously stored in the memory; and
output the information regarding the first call on a call taker device while keeping at least some identifying information of the first caller anonymous to an operator of the call taker device.

* * * * *